(12) United States Patent
Maehara

(10) Patent No.: US 7,064,113 B2
(45) Date of Patent: Jun. 20, 2006

(54) RESIN COMPOSITION, METHOD OF MOLDING THE SAME, AND METHOD OF RECYCLING RESIN COMPOSITION

(75) Inventor: Hiroshi Maehara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 10/096,016

(22) Filed: Mar. 13, 2002

(65) Prior Publication Data

US 2002/0130436 A1    Sep. 19, 2002

(30) Foreign Application Priority Data

Mar. 16, 2001    (JP) .............................. 2001-076559

(51) Int. Cl.
  *B29C 45/00*    (2006.01)
  *B29C 47/00*    (2006.01)
  *C09K 19/52*    (2006.01)

(52) U.S. Cl. .......................... 514/52; 514/50; 536/58; 536/76; 536/85; 536/124; 536/107; 162/68; 528/354; 106/168.01; 521/84.1; 264/176.1; 264/328.1; 252/299.01

(58) Field of Classification Search .................. 514/52, 514/50; 536/58, 76, 85, 124, 107; 162/68; 528/354; 106/168.01; 521/84.1; 524/47; 525/439; 264/176.1, 328.1; 252/299.01
See application file for complete search history.

(56) References Cited

U.S. PATENT DOCUMENTS

| 5,021,475 | A |   | 6/1991  | Isayev .......................... 524/30 |
| 5,244,945 | A |   | 9/1993  | Elion ........................... 524/10 |
| 6,225,019 | B1 |  | 5/2001  | Matsuda et al. .......... 430/270.1 |
| 6,653,364 | B1 | * | 11/2003 | Maehara ...................... 523/1 |

FOREIGN PATENT DOCUMENTS

| EP | 0 535 650 A2 |   | 4/1993 |
| EP | 0 637 614 A2 |   | 2/1995 |
| JP | 58-103538    |   | 6/1983 |
| JP | 60-166301    |   | 8/1985 |
| JP | 63-46242     |   | 2/1988 |
| JP | 63046242     | * | 2/1988 |
| JP | 63046242 A   | * | 2/1988 |
| JP | 9-84183      |   | 3/1997 |
| JP | 9-230567     |   | 9/1997 |
| JP | 2000-75502   |   | 3/2000 |
| JP | 2000-143702  |   | 5/2000 |
| JP | 2000-226581  |   | 8/2000 |
| JP | 2001-226406  |   | 8/2001 |

OTHER PUBLICATIONS

Maehara, Hiroshi, "Photosensitive resin composition, resist composition, fabricating method for patterned substrate and device." U.S. Appl. No. 09/998,228, filed Dec. 3, 2001.*

S. Suto et al., "A Comparative Study of the Thermotropic Mesomorphic Tendencies and Rheological Characteristics of Three Cellulose Derivatives: Ethylene and Propylene Oxide Ethers and an Acetate Butyrate Ester," 21 *Rheol. Acta* 62-71 (1982).

Chem. Abstracts: 126:279160; Baiqian Li et al., "Study of Rheological Behavior of Thermoplastic Liquid Crystalline Cellulose Derivatives and Their Thermoplastic Composites," 13(2) *Gaofenzi Cailiao Kexue Yu Gongcheng* 109-112 (1997) (XP00203933).

Chem. Abstracts: 125:89367; Yoshiyuki Nishio et al., "Cellulose Polymers as Functional Materials. Liquid Crystal Formation and Biodegradability," 7(5) *Shinsozai* 8-12 (1996) (XP00203934).

So-Lan Tseng et al., "Prospanoate Ester of (2-Hydroxypropyl)cellulose: A Thermotropic Cholesteric Polymer That Reflects Visible Light at Ambient Temperatures," 15 *Macromol.* 1262-1264 (1982).

Yamagashi Miyamoto, *Kobunshi Kako*, 38:12 (1989).

* cited by examiner

*Primary Examiner*—James O. Wilson
*Assistant Examiner*—Devesh Khare
(74) *Attorney, Agent, or Firm*—Fitzpatrick, Cella, Harper & Scinto

(57) ABSTRACT

A resin composition, which comprises a biodegradable polymer and a biodegradable liquid crystalline polymer. The resin composition is useful for producing molded resin articles having good recyclability.

8 Claims, No Drawings

RESIN COMPOSITION, METHOD OF MOLDING THE SAME, AND METHOD OF RECYCLING RESIN COMPOSITION

BACKGROUND OF THE INVENTION

1. Field of the Invention

The present invention relates to a resin material that lessens the burden on the global environment. The present invention also relates to a method of recycling the resin composition for material circulation to build a recycling society.

2. Related Background Art

Mankind has successively created various materials useful in daily lives and in industries through the coal chemistry age and the petroleum chemistry age. In particular, the symbolic examples of these materials are synthetic polymer resins, which include plastic materials, such as polyethylene, polypropylene, and polyvinyl chloride; and rubbers such as polyisoprene, and polybutadiene. Recently, novel resin materials having excellent properties have been developed, including polyimide resins and all-aromatic liquid crystalline polymers having high heat resistance and high impact strength.

In recent years, however, in the industrial structure based on mass production, mass consumption, and mass waste, discarded polymers have caused a number of problems. Specifically, the discarded materially stable polymer materials remain undecomposed in the soil for a long time, gradually releasing endocrine disruptors and other harmful substances that occasionally have serious adverse effects on living organisms. When the polymer materials are incinerated, toxic materials, such as dioxin, can be generated depending on the incineration conditions, causing an extreme danger. Another waste material that causes environmental problems is waste paper, a large amount of which is discharged from offices.

Under such circumstances, materials and products that do not destroy the environment are wanted. Further, technical developments are required that enable conservation of the environment by minimizing the consumption of global resources and by recycling the materials.

On the other hand, one of the general methods for improving the properties of the polymer is an introduction of a fiber structure into a polymer by blending a foreign material. Generally, this method includes blending an inorganic material, such as a glass fiber, and a carbon fiber; blending an organic polymer fiber, such as a nylon fiber, and a polyester fiber; and blending a liquid crystalline polymer having high orientability. For example, U.S. Pat. No. 6,248,267 discloses a natural-fiber-containing nonwoven fabric. Lately, the amounts of industrial waste materials and household waste materials are increasing, and the disposed materials are causing a social problem. Generally, organic polymer materials, such as polyethylene and polypropylene are stable, and once discarded, they will persist in the soil for a long time. To avoid such a problem, the use of a biodegradable polymer materials is considered. However, biodegradable polymers do not have satisfactory properties in the broad range of application fields in comparison with the versatile polymer materials. The properties of a biodegradable polymer can be improved by blending the aforementioned fiber material. However, the blended filler, which is not biodegradable, makes recycling difficult, resulting in an increased burden on the environmental by remaining undecomposed for a long time after disposal.

SUMMARY OF THE INVENTION

The present invention intends to provide a resin composition useful for production of molded resin articles, which can be readily recycled without remaining after disposal.

The resin composition of the present invention comprises a biodegradable polymer and a biodegradable liquid crystalline polymer.

The process of producing a molded resin article of the present invention comprises molding the above resin composition at a molding temperature not higher than the liquid crystal transition temperature of the liquid crystalline polymer contained in the resin composition.

The molded resin article of the present invention is obtained by molding the above resin composition.

The method of reusing waste paper of the present invention comprises the steps of producing at least one of a biodegradable polymer and a liquid crystalline polymer from the waste paper, and producing a resin composition of the above composition by use of at least one aforementioned polymer.

The method of recycling the resin composition having the above composition comprises decomposing the molded resin article composed of the resin composition to obtain a decomposition product, recovering at least one of the aforementioned biodegradable polymer and the aforementioned liquid crystalline polymer from the decomposition product, and reusing the above obtained at least one polymer for production of the resin composition.

The present invention provides a resin composition useful for producing a molded resin article which does not persist after disposal and is readily recyclable. In particular, the resin composition of the present invention can be produced by use of a component derived from waste paper. When the molded article of this resin composition is discarded after use, the polymer component can be recycled by recovering the polymer component from the discarded molded resin article.

DETAILED DESCRIPTION OF THE PREFERRED EMBODIMENTS

The resin composition of the present invention contains at least a biodegradable polymer and a biodegradable liquid crystalline polymer. The resin composition of the present invention can be composed of only biodegradable components. Such a polymer does not cause the persistency problem after disposal, and can be recycled readily. The liquid crystalline polymer can give an oriented polymer molecule structure to the molded article to improve the mechanical strength of the molded article.

The biodegradable polymer employed is selected from those, which are biodegradable and not liquid-crystalline, and preferably contains a sugar structure. The polymer having a sugar structure includes polymers such as starch, cellulose, chitin, chitosan, pullulan, and curdlan; copolymers of D-glucose with an aliphatic dicarboxylic acid such as malonic acid, succinic acid, glutaric acid, adipic acid, pimelic acid, suberic acid, azelaic acid, and sebacic acid; copolymers of D-glucose with an aromatic dicarboxylic acid such as terephthalic acid, isophthalic acid, naphthalene dicarboxylic acid, and naphthalic acid; and copolymers with another compound such as polyether, polyvinyl alcohol, polymalic acid, polyhydroxyalkanoate, and polylactic acid. The biodegradable polymer selected from the above-mentioned polymers may be used singly or in combination of two or more thereof, as necessary. Of these, preferred are polymers containing glucose as the sugar component.

The biodegradable polymer preferably has a molecular weight (weight average) ranging from 100,000 to 5,000,000.

On the other hand, the biodegradable liquid crystalline polymer preferably has biodegradability, and has characteristics of a liquid crystal in a solution or in a molten state, and has an orientational structure.

Such a liquid crystalline polymer includes cellulose and polymers having an alkyl group on the side chain of a cellulose derivative. Examples thereof are described, for instance, in "Miyamoto, Yamagishi: Kobunshi Kako, 38, 12, (1989)", and "S. Tseng et al.: Macromolecules, 15, 1262 (1982)". Formulas (1) to (3) shows typical examples the polymer:

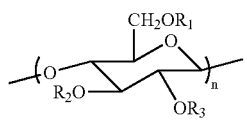

(1)

wherein $R_1$, $R_2$, and $R_3$ independently denote hydrogen or an aliphatic ester with 1 to 10 carbon atoms;

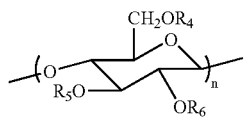

(2)

wherein $R_4$, $R_5$, and $R_6$ independently denote hydrogen or an alkyl group with 1 to 10 carbon atoms; and

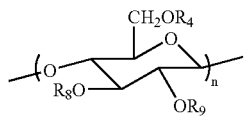

(3)

wherein $R_7$, $R_8$, and $R_9$ independently denote hydrogen or a hydroxyalkyl group with 1 to 10 carbon atoms.

The cellulose derivative includes methylcellulose, ethylcellulose, carboxymethylcellulose, hydroxyethylcelluollose, and hydroxypropylcellulose. The alkyl group is introduced by directly bonding an alkyl group by utilizing the three hydroxyl groups of D-glucose, a repeating unit of the cellulose molecule, by bonding an alkyl group by utilizing the hydroxyl group of hydroxyethylcellulose or hydroxypropylcellulose, by utilizing the lower alkyl groups of a cellulose derivatives such as methylcellulose, ethylcellulose, and carboxymethylcellulose, or utilizing the remaining hydroxyl groups of these compounds. The alkyl group can be bonded to the cellulose or the cellulose derivative through ester bonding, ether bonding, amide bonding, or the like. Specific examples include hydroxyalkylcellulose, such as hydroxyethylcellulose, and hydroxypropylcellulose, and reaction products of hydroxyalkylcellulose with an aliphatic carboxylic acid, such as acetic acid, propionic acid, butyric acid, valeric acid, caproic acid, enanthic acid, caprylic acid, pelargonic acid, capric acid, undecylic acid, lauric acid, and tridecanedioic acid. Hydroxypropylcellulose is particularly preferred as the cellulose derivative for the alkyl group introduction. The liquid crystalline polymer may be employed singly or in combination of two or more thereof.

In the above Chemical Formulas (1) to (3), the degree of substitution by a substituent other than hydrogen is not lower than 20% in a molecule to develop the liquid crystal properties.

The molecular weight (weight average) of the liquid crystalline polymer ranges, for example, from about 100,000 to about 5,000,000, but is not limited thereto.

The liquid crystal transition temperature of the liquid crystalline polymer can be varied depending on the type of the alkyl group or the reaction degree in the alkyl group introduction. These temperature characteristics can be selected in consideration of the molding temperature of the blending polymer. For example, in the case where a copolymer of D-glucose and sebacic acid having a molding temperature of about 110° C. is used as the biodegradable polymer, a reaction product of hydroxyethylcellulose and butyric acid is preferably used as the liquid crystalline polymer. At a 70% degree of substitution of hydroxyethylcellulose with butyric acid, the liquid crystal transition temperature of the reaction product is 135° C. This temperature is nearly equal to the molding temperature of the above polymer.

In blending the biodegradable polymer and the liquid crystalline polymer, the blending ratio (A)/((A)+(B)), where (A) represents the mass of the biodegradable polymer and (B) represents the mass of the liquid crystalline polymer, ranges preferably from 0.05 to 0.95.

The resin composition of the present invention is obtained by filling or blending of the liquid crystal polymer into the biodegradable polymer. The mixing of these components can be conducted by any known method.

Incidentally, use of cellulose or the like recovered from paper, especially waste paper, as the source material for the biodegradable polymer or liquid crystalline polymer, can increase the recyclability of waste paper. Any known process can be employed for producing the polymer component for the resin composition from waste paper.

The simple mixture of the biodegradable polymer and the liquid crystalline polymer can be used as the resin composition. If necessary, an additive may be incorporated thereto provided that the object of the present invention is achievable. The additive includes plasticizers, pro-oxidant, age resistor, crosslinking agents, surfactants, and compatibilizing agents. The additive should be selected such that it causes a minimum environmental burden. In use of the material in a closed system where the material is completely recycled, a usual additive may be used.

The application field of the resin composition is not specifically limited. The resin composition is useful, for example, as constituent materials for ink tanks of ink-jet printers, toner containers of electrophotography apparatuses, packing materials, casings of printers and cameras, transparency sheets, and so forth.

The processing and molding conditions of the resin composition of the present invention are selected depending on the properties of the biodegradable polymer and the liquid crystalline polymer to be combined. In the case where the biodegradable polymer is thermoplastic or thermally fusible, the molding conditions and press conditions are selected depending on the softening point, glass transition temperature, melting point thereof and the like. The molding temperature is preferably set to be not higher than the liquid crystal transition temperature of the liquid crystalline polymer, as described above. The resin composition can be molded by various molding processes including injection molding and extrusion molding.

The molded article obtained from the resin composition of the present invention can be recycled effectively after it is discarded. For example, the molded article is decomposed by an acid treatment, or a high-temperature and high-pressure water treatment; the polymer components are recovered from the resulting decomposition product; and the polymer component is used as at least one source material of the resin composition of the present invention.

EXAMPLES

The present invention is described below in more detail with reference to examples. The unit "percent (%)" is based on mass.

Example 1

Reaction of Hydorxyethylcellulose and Butyric Acid 39.3 g of butyric acid was placed in a four-neck separable flask, equipped with a refluxing device and a stirrer. Nitrogen gas was bubbled therein for one hour to replace the dissolved oxygen. Thereto, 50 mL of trifluoroacetic anhydride was added gradually under a nitrogen gas flow. The temperature was elevated gradually to 50° C. by a water bath, and the activation was conducted for 30 minutes. Therein 4.6 g of dried solid hydroxyethylcellulose was added gradually through an inlet. The polymer was dissolved quickly. Under these conditions, the reaction was continued further for 5 hours. After the reaction, the reaction mixture was poured into a large amount of water to precipitate a butyric acid ester of hydroxyethylcellulose. The obtained polymer was dried and purified by repetition of re-dissolution in acetone and reprecipitation in water. The yield of the polymer was 6.1 g.

The obtained polymer (weight-average molecular weight: 350,845) was confirmed to be the intended substance by IR absorption spectroscopy and NMR and found to have a liquid crystal transition temperature of 135° C. by thermal analysis.

Example 2

Reaction of Hydroxypropylcellulose and Iodobutane

In a sufficiently dried four-neck separable flask, equipped with a refluxing device and a stirrer, hydroxypropylcellulose (hereinafter, HPC) was dissolved in THF, and thereto a solution of n-butyllithium in hexane was added. After stirring for 30 minutes, the mixture was heated to 66° C., and thereto iodobutane was added dropwise while refluxing the THF. The mixture was allowed to react for 10 hours.

After the reaction, the reaction product was precipitated in deionized water to obtain a butyl ether compound of HPC. The obtained polymer was purified by repetition of dissolution in acetone and precipitation in deionized water.

The obtained polymer (weight-average molecular weight: 475,000) was confirmed to be the intended substance by IR absorption spectroscopy and NMR, and found to have a liquid crystal transition temperature of 125° C. by a thermal analysis.

Example 3

In a sufficiently dried four-neck separable flask equipped with a refluxing device and a stirrer, industrial alkali-cellulose was reacted with butyl iodide in DMSO solution to produce cellulose butyl ether. After the reaction, the reaction product was precipitated in deionized water to obtain a cellulose butyl ether compound. The obtained polymer was purified by repetition of dissolution in acetone and precipitation in deionized water.

The obtained polymer (weight-average molecular weight: 255,000) was confirmed to be the intended substance by IR absorption spectroscopy and NMR and found to have a liquid crystal transition temperature of 160° C. by thermal analysis.

Example 4

The polymer obtained in Example 1 was dissolved in cyclohexanone with a concentration of 5%. The solution was spin-coated on a glass substrate at a rotation speed of 3000 rpm. This substrate was observed by polarizing microscopy to confirm the molecular orientation state.

Example 5

An acetone solution of the polymer obtained in Example 2 was dropped onto a glass substrate and was dried. This substrate was placed on a hot plate kept at 130° C. With another glass substrate, the polymer was pressed while applying a shear stress. Then, the substrate was transferred onto a cooled metal plate to cool the polymer. After cooling, the polymer was observed by polarizing microscopy to confirm the molecular orientation in the direction of the force application.

Example 6

A DMSO solution of the polymer obtained in Example 3 was dropped onto a glass substrate and was dried. This glass substrate was placed on a hot plate kept at 170° C. With another glass substrate, the polymer was pressed while applying a shear stress. Then, the substrate was transferred onto a cooled metal plate to cool the polymer. After cooling, the polymer was observed by polarizing microscopy to confirm the molecular orientation in the direction of the force application.

Example 7

The polymer obtained in Example 1 was blended in a blending ratio of 20% with a glucose-sebacic acid copolymer, which is a biodegradable resin and has a weight-average molecular weight of 50,000, to prepare a resin composition. This resin composition was molded by an injection molding machine at 140° C. The molded sample had a tensile strength improved by a factor of 1.5 in comparison with the glucose-sebacic acid copolymer before blending. The orientation of the resin was confirmed by observation of the broken-out section using electron microscopy.

Example 8

The polymer obtained in Example 1 was blended with a blending ratio of 25% with polylactic acid, which is a biodegradable resin and has a weight-average molecular weight of 150,000, to prepare a resin composition. This resin composition was molded by an injection molding machine at 140° C. The molded sample had a tensile strength improved by a factor of 2 in comparison with the polylactic acid before blending.

Example 9

A polymer was synthesized in the same manner as in Example 3, except that a cellulose material separated from waste paper was used in place of the industrial cellulose as the source material. The obtained polymer was similar to the polymer obtained in Example 3 in appearance and properties.

Example 10

A transparency sheet was prepared by blending the butyl ester of hydroxyethylcellulose (HEC) obtained in Example 1 with polylactic acid, and press-molding the resulting blend. This sheet has excellent transparency, because it does not absorb visible light. This sheet was compatible with ink and had excellent printability, because this sheet is based on a cellulose source material. Furthermore, due to a single layer structure of the sheet formed from the resin composition of the present invention, this sheet did not curl or otherwise deform, which may happen in multilayered sheets due to the difference in thermal expansion coefficients as temperature is increased.

Example 11

The transparency sheet molded in Example 10 was shredded into chips by a shredder. The sheet chips were decomposed by fuming hydrochloric acid (at a temperature of 25° C.) or high-temperature and high-pressure water (at a pressure of 35 MPa and a temperature of 400° C.). The glucose chemically separated from the decomposition product was used as a source material for synthesis of a glucosese-bacic acid copolymer.

Example 12

The transparent sheet molded in Example 10 was melted and pressed again to mold a transparency sheet. This sheet was found to be usable as a transparency sheet without causing a problem in light transmissivity and other properties.

Example 13

The transparency sheet molded in Example 10 was melted, pelletized, and molded by an injection machine into a casing of an ink-jet printer. The casing was formed without problem in molding.

What is claimed is:

1. A resin composition, comprising a biodegradable non-liquid-crystalline polymer having a sugar structure and a biodegradable liquid crystalline polymer, which includes cellulose or a cellulose derivative polymer having an alkyl group on a side chain thereof.

2. The resin composition according to claim 1, wherein the liquid crystalline polymer has a structure represented by Formula (1):

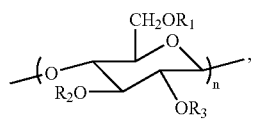

wherein $R_1$, $R_2$ and $R_3$ independently denote hydrogen or an aliphatic ester of 1 to 10 carbon atoms, and wherein n is such that a Daltons of the liquid crystalline polymer is from 100,000 to 5,000,000.

3. The resin composition according to claim 1, wherein the liquid crystalline polymer has a structure represented by Formula (2):

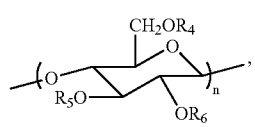

wherein $R_4$, $R_5$ and $R_6$ independently denote hydrogen or an alkyl group of 1 to 10 carbon atoms, and wherein n is such that a Daltons of the liquid crystalline polymer is from 100,000 to 5,000,000.

4. The resin composition according to claim 1, wherein the liquid crystalline polymer has a structure represented by Formula (3):

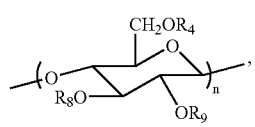

wherein $R_7$, $R_8$ and $R_9$ independently denote hydrogen or a hydroxyalkyl group of 1 to 10 carbon atoms, and wherein n is such that a Daltons of the liquid crystalline polymer is from 100,000 to 5,000,000.

5. The resin composition according to claim 4, wherein the liquid crystalline polymer is hydroxypropylcellulose.

6. The resin composition according to claim 1, wherein a blending ratio of (A)/((A)+(B)) ranges from 0.05 to 0.95, where (A) represents the mass of the biodegradable polymer and (B) represents the mass of the liquid crystalline polymer.

7. The resin composition according to claim 1, wherein the liquid crystalline polymer has an oriented polymer molecule structure.

8. The resin composition according to claim 1, wherein the biodegradable non-liquid-crystalline polymer has a structure comprising glucose.

* * * * *

UNITED STATES PATENT AND TRADEMARK OFFICE
CERTIFICATE OF CORRECTION

PATENT NO. : 7,064,113 B2
APPLICATION NO. : 10/096016
DATED : June 20, 2006
INVENTOR(S) : Hiroshi Maehara It is certified that error appears in the above-identified patent and that said Letters Patent is hereby corrected as shown below:

ON COVER PAGE AT (56) U.S. PATENT DOCUMENTS

"6,653,364 B1 * 11/2003 Maehara ..... 523/1" should read
--6,653,364 B2 * 11/2003 Maehara ..... 523/1.

ON COVER PAGE AT (56) FOREIGN PATENT DOCUMENTS

"JP 63046242 * 2/1988" should be deleted; and
"JP 63046242 A * 2/1988" should read --JP 63-46242 A * 2/1988--.

ON COVER PAGE AT (56) OTHER PUBLICATIONS

"Chem. Abstracts: 126:279160; Baiqian Li et al., "Study of Rheological Behavior of
    Thermoplastic Liquid Crystalline Cellulose Derivatives and Their
Thermoplastic Composites." 13(2) *Gaofenzi Cailiao Kexue Yu Gongcheng* 109-112
(1997) (XP00203933)."

should read

--"Chem. Abstracts" 126:279160; Baiqian Li et al., "Study of Rheological Behavior
    of Thermoplastic Liquid Crystalline Cellulose Derivatives and Their
    Thermoplastic Composites." 13(2) *Gaofenzi Cailiao Kexue Yu Gongcheng*
    109-112 (1997) (XP002203933).--;

"Chem. Abstracts: 125:89367; Yoshiyuki Nishio et al., "Cellulose Polymers as
    Functional Materials. Liquid Crystal Formation and Biodegradability." 7(5)
    *Shinsozai* 8-12 (1996) (XP00203934)."

should read

--Chem. Abstracts: 125:89367; Yoshiyuki Nishio et al., "Cellulose Polymers as
Functional Materials. Liquid Crystal Formation and Biodegradability." 7(5) *Shinsozai*
8-12 (1996) (XP002203934).--; and

UNITED STATES PATENT AND TRADEMARK OFFICE
CERTIFICATE OF CORRECTION

PATENT NO. : 7,064,113 B2
APPLICATION NO. : 10/096016
DATED : June 20, 2006
INVENTOR(S) : Hiroshi Maehara It is certified that error appears in the above-identified patent and that said Letters Patent is hereby corrected as shown below:

"So-Lan Tseng et al., "Prospanoate Ester of (2-Hydroxypropyl)cellulose: A Thermotropic Cholesteric Polymer That Reflects Visible Light at Ambient Temperatures," 15 *Macromol.* 1262-1264 (1982)."

should read

--So-Lan Tseng et al., "Propanoate Ester of (2-Hydroxypropyl)cellulose: A Thermotropic Cholesteric Polymer That Reflects Visible Light at Ambient Temperatures," 15 *Macromol.* 1262-1264 (1982).

COLUMN 1

Line 66, "environmental" should read --environment--.

COLUMN 3

Lines 40-45, " 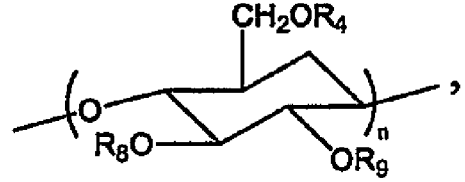 (3) " should read

-- 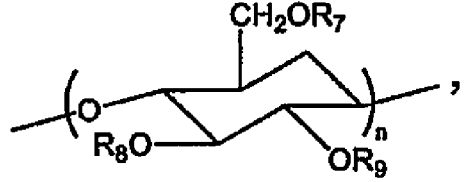 (3) --; and

Lines 51, "hydroxyethylcellullose," should read --hydroxyethylcellulose,--.

COLUMN 5

Line 24, "Hydorxyethylcellulose" should read --Hydroxyethylcellulose--.

COLUMN 7

Line 36, "glucosese-bacic" should read --glucose-sebacic--.

UNITED STATES PATENT AND TRADEMARK OFFICE
CERTIFICATE OF CORRECTION

PATENT NO. : 7,064,113 B2 Page 3 of 3
APPLICATION NO. : 10/096016
DATED : June 20, 2006
INVENTOR(S) : Hiroshi Maehara It is certified that error appears in the above-identified patent and that said Letters Patent is hereby corrected as shown below:

COLUMN 8

Lines 35-40, " 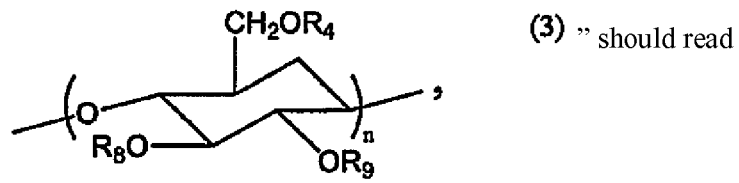 (3) " should read

-- 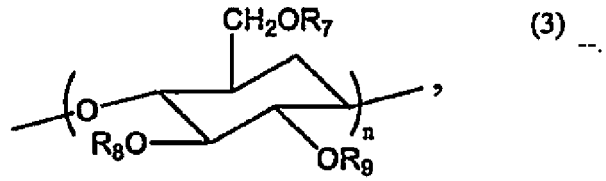 (3) --.

Signed and Sealed this

Sixteenth Day of January, 2007

JON W. DUDAS
*Director of the United States Patent and Trademark Office*